United States Patent
Shalvi et al.

(10) Patent No.: US 7,545,890 B1
(45) Date of Patent: Jun. 9, 2009

(54) METHOD FOR UPSTREAM CATV CODED MODULATION

(75) Inventors: Ofir Shalvi, Herzlia (IL); Itay Lusky, Tel Aviv (IL); Ariel Yagil, Ramat Hasharon (IL)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/493,526

(22) Filed: Jan. 28, 2000

Related U.S. Application Data

(60) Provisional application No. 60/117,962, filed on Jan. 29, 1999.

(51) Int. Cl.
*H04L 27/06* (2006.01)

(52) U.S. Cl. ............... 375/341; 375/262; 714/795

(58) Field of Classification Search ........... 375/259, 375/262, 261, 279, 281, 286, 295, 298, 316, 375/331, 340, 341, 346, 348; 714/786, 752, 714/794–795
See application file for complete search history.

(56) References Cited

U.S. PATENT DOCUMENTS

| | | | | |
|---|---|---|---|---|
| 4,493,082 A * | 1/1985 | Cumberton et al. | ......... | 714/792 |
| 4,581,601 A * | 4/1986 | Calderbank et al. | ........... | 341/95 |
| 5,321,725 A * | 6/1994 | Paik et al. | ................... | 375/265 |
| 5,343,500 A * | 8/1994 | Betts et al. | ................... | 375/262 |
| 5,355,376 A * | 10/1994 | Cox et al. | ................... | 714/795 |
| 5,465,267 A * | 11/1995 | Todoroki | ................... | 375/279 |
| 5,511,096 A * | 4/1996 | Huang et al. | ................. | 375/265 |
| 5,812,603 A * | 9/1998 | Luthi et al. | ................. | 375/287 |
| 5,838,728 A * | 11/1998 | Alamouti et al. | ............ | 375/265 |
| 5,881,363 A * | 3/1999 | Ghosh et al. | ................. | 725/125 |
| 5,996,103 A * | 11/1999 | Jahanghir | ................... | 714/755 |
| 6,034,997 A * | 3/2000 | Mackenthun | ............... | 375/265 |
| 6,151,296 A * | 11/2000 | Vijayan et al. | ................. | 370/208 |
| 6,188,717 B1 * | 2/2001 | Kaiser et al. | ................. | 375/148 |
| 6,282,168 B1 * | 8/2001 | Vijayan et al. | ............... | 370/203 |
| 2001/0017849 A1 * | 8/2001 | Campanella et al. | ......... | 370/326 |
| 2004/0223536 A1 * | 11/2004 | Schilling | .................... | 375/145 |

* cited by examiner

*Primary Examiner*—Jean B Corrielus
(74) *Attorney, Agent, or Firm*—Steven A. Shaw; W. James Brady; Frederick J. Telecky, Jr.

(57) ABSTRACT

The present invention provides an encoding method and a class of decoding methods that provide methods for high throughput and high robustness digital communications over channels that are contaminated by impulse noise, as well as white and colored additive noise (noise that is characterized by heavy-tailed distribution), phase noise and signal fading.

1 Claim, 3 Drawing Sheets

METHOD FOR UPSTREAM CATV CODED MODULATION

This application claims priority under 35 USC §119(e)(1) of Provisional Application No. 60/117,962 filed Jan. 29, 1999.

TECHNICAL FIELD OF THE INVENTION

The present invention relates to a method for combating ingress and impulse noise using coded modulation, and more particularly, to a system of communications for a CATV upstream plant using TDMA QAM modulation and a Bit-Interleaved Coded Modulation (BICM).

BACKGROUND OF THE INVENTION

Impulse and burst noise is a major impairment of the upstream channel of many CATV plants. A few technologies have been proposed to combat this noise, including Reed-Solomon coding, S-CDMA modulation, and OFDM (DMT) modulation.

BICM has been proposed by Zehavi and by Bigliery, as a technology for combating signal fading, which is a major impairment of wireless channels.

SUMMARY OF THE INVENTION

The present invention provides a coding method and a class of decoding methods that allow high throughput and high robustness digital communications over channels that are contaminated by impulse noise, as well as white and colored additive noise (noise that is characterized by heavy-tailed distribution), phase noise and signal fading. The class of decoding methods includes a low-complexity, low-delay method, and an iterative method, which is capable of lower error rate but with a higher complexity and higher delay.

This method is particularly useful in communications over CATV (cable TV) channels in the upstream direction, and a manner of using the method within a modulator previously proposed in the DOCSIS specification is provided.

The bit-interleaved coded modulation (BICM) encoding method of the present invention uses a conventional convolution encoder, a bit interleaving matrix and a conventional QAM mapper. The BICM encoder can be concatenated with an outer Reed-Solomon encoder.

The method of the present invention is highly robust to impulsive noise since the all the data bits are protected by the encoder, and due to the time diversity that is inserted into the signal as a result of the interleaving operation. The performance of this method in the presence of AWGN when using the methods described herein, combined with a Reed-Solomon encoder/decoder is better by 1-5 dB than the performance when using only a Reed-Solomon encoder/decoder.

DETAILED DESCRIPTION

The present invention provides a coding method and a class of decoding methods that provide methods for high throughput and high robustness digital communications over channels that are contaminated by impulse noise, as well as white and colored additive noise (noise that is characterized by heavy-tailed distribution), phase noise and signal fading. The class of decoding methods includes a low-complexity, low-delay method, and an iterative method, which is capable of lower error rate but with a higher complexity and higher delay.

This method is particularly useful in communications over CATV (cable TV) channels in the upstream direction, and a manner of using the method within a modulator previously proposed in the DOCSIS specification is provided.

Figure 1:
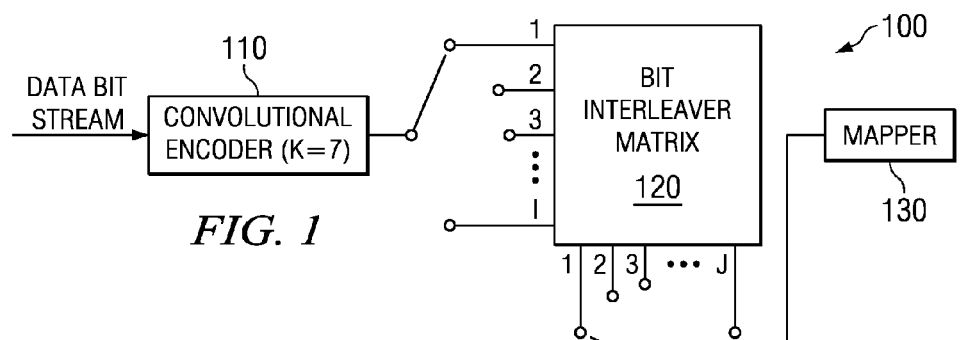
FIG. 1 depicts a block diagram of the transmitter of the present invention.

The bit-interleaved coded modulation (BICM) encoding method of the present invention uses a conventional convolution encoder 110, a bit interleaving matrix 120 and a conventional QAM mapper 130, as depicted in FIG. 1. The BICM encoder 100 can also be concatenated with an outer Reed-Solomon encoder.

The method of the present invention is highly robust to impulsive noise since the all the data bits are protected by the encoder, and due to the time diversity that is inserted into the signal as a result of the interleaving operation. The performance of this method in the presence of AWGN when using the methods described herein, combined with a Reed-Solomon encoder is better by 1-5 dB than the performance when using only a Reed-Solomon encoder.

Figure 6:
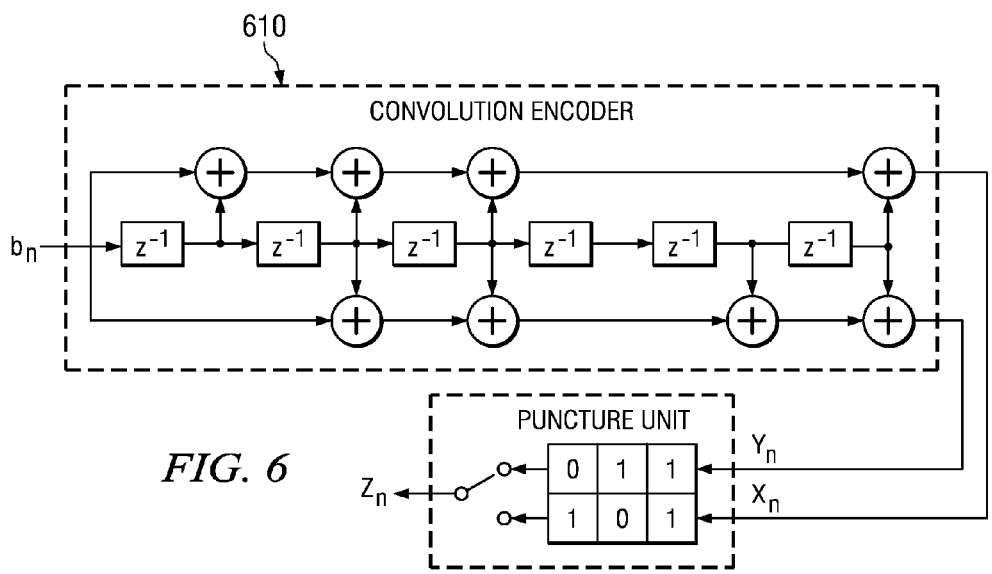
FIG. 6 shows a BICM bit encoder having a rate ½ convolution encoder followed by a puncturing unit.
Figure 7:
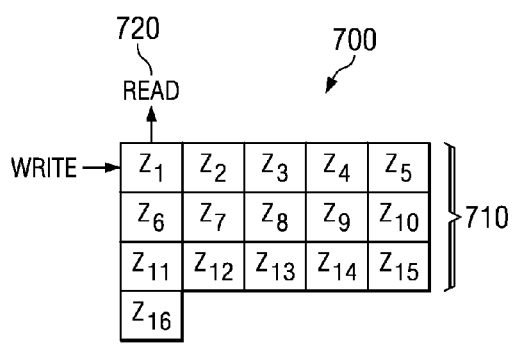
FIG. 7 is a bit interleaving example.

In a presently preferred embodiment, the convolution encoder 610 is a preferably punctured rate ½ convolution encoder with k=7 constraint length and generating polynomial 171 octal and 133 octal, as depicted in FIG. 6. The coded bits are used to fill the rows 710 of the interleaver matrix 700 and are read column wise 720, as depicted in FIG. 7. The preferred mapper uses Gray code mapping. Before the first data bit, the convolution encoder is initialized to a pre-determined state (e.g. all zeros). After the last data bit, the state of the encoder is brought to a pre-determined value by feeding dummy data bits into the encoder (e.g. feeding six zero bits).

Alternatives to the Preferred Embodiment are:

1. The encoder may employ multiple convolution encoders, wherein each encoder generates a portion of the input bits to the interleaver memory. For example, the odd lines and the even lines of the interleaver can be decoded by two different encoders. Another example—each bit of the QAM symbols can be generated by a different encoder. This allows for the use of different convolution encoders.
2. An alternative interleaving algorithm is random-address interleaving (i.e. the data bits are written serially and read in a non-regular manner, e.g. the address is generated by a random number generator).

Receiver methods: The BICM decoder of the present invention may be implemented in several ways. The present invention describes two decoding algorithms: A simple non-iterative method depicted in FIG. 2, and an iterative method.

The Non-Iterative method is a computationally efficient approximation of the MLSE algorithm for the case of AWGN. The complexity of this decoding method is equivalent to the complexity of convolutional decoder modules that are used in various low cost IC's, such as DBS receiver's IC's.

The performance of the method has been compared to the performance of the MLSE method for a few simple scenarios, such as the case of AWGN channel and non-interleaved signal, and the difference in performance was less than 1 dB in the noise level. In the case of QPSK modulation, the method is an MLSE method.

Figure 2:
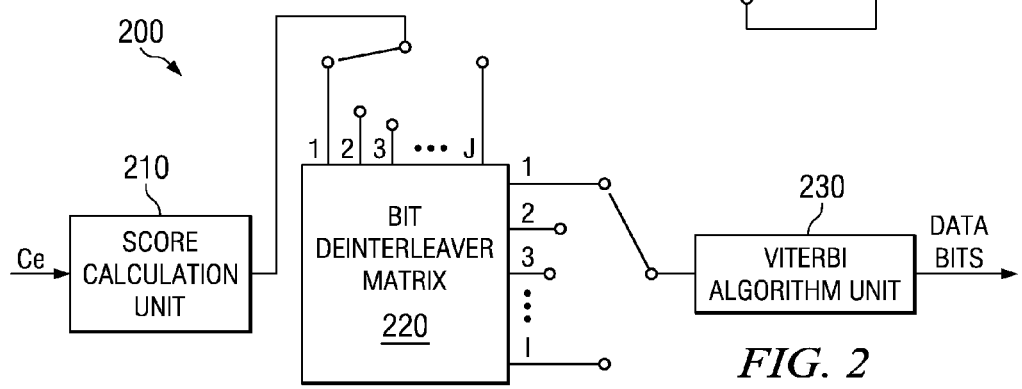
FIG. 2 depicts a block diagram of the non-iterative BICM decoder of a receiver of the present invention.

The method is very similar to the conventional Viterbi method for convolutionally encoded QPSK or BPSK signals. As depicted in FIG. 2, BICM decoder 200 is implemented by three units 210, 220, 230.

A Score Calculation Unit 210 outputs the approximated scores of each channel bit.

Figure 3:
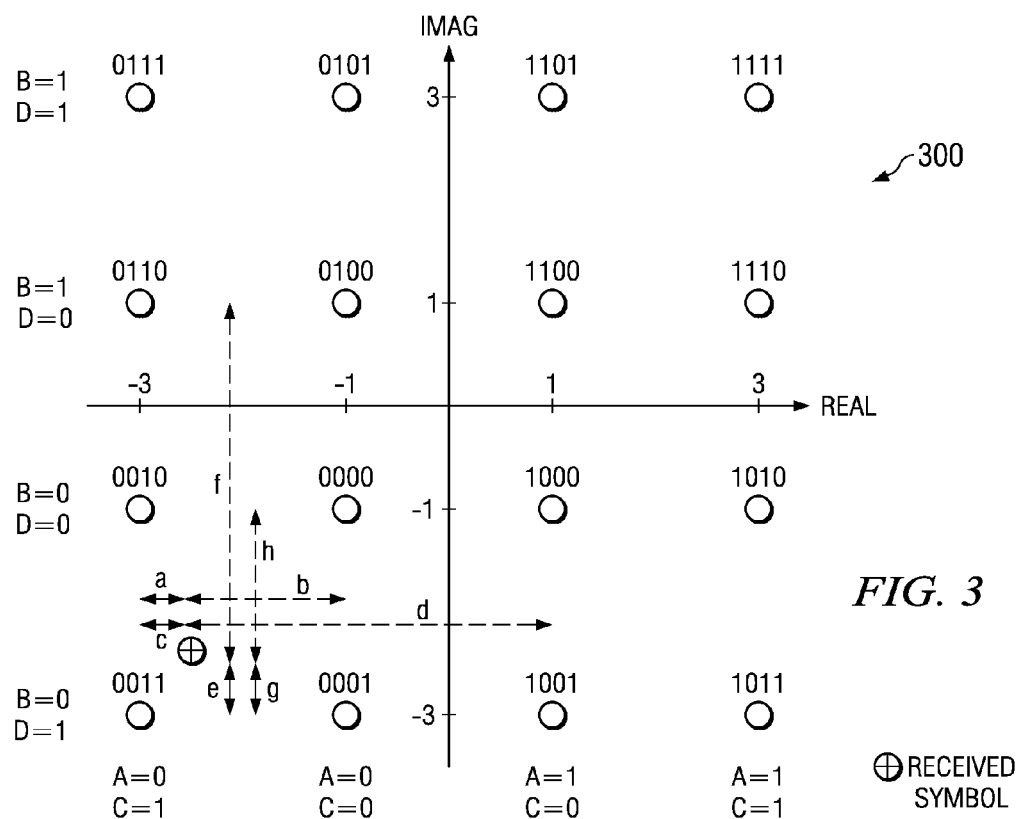
FIG. 3 illustrates a score calculation technique for the case of 16QAM.

Due to Gray code mapping, the real part and the imaginary part of the QAM symbols can be decoupled into two independent real valued PAM symbols, where each channel bit effects only one such PAM symbol. Thus, the approximated score of the channel bit b given "0" value, denoted by $L_0(b)$, is the square of the distance of the real or imaginary component of the decoder input to the nearest PAM symbol having a "0" value in the corresponding bit position. Similarly, $L_1(b)$ is the squared distance to the nearest PAM symbol having a "1" value in the corresponding bit position. FIG. 3 depicts a scoring example for a 16 QAM constellation map.

The scores are than clipped by a given threshold (i.e. if the score is higher than the threshold then the value of the threshold is assigned to the score). The threshold value may be an adaptive parameter. It set to be m times the variance of the noise, and m is increased to a high value (e.g. 25) when the noise is identified as a Gaussian process, and decreased to a low value (e.g. 4) when the noise is identified as a non-Gaussian process with heavy tailed distribution. Thus, the receiver may employ devices for tracking the noise variance and the tail of its distribution (e.g. measuring Kurtosis or the percentage of time the noise power is above 9 and 25 times its variance)

There are alternative computationally efficient approaches to approximate the score. One alternative approach is to use a one-dimensional look-up table whose input is the real or imaginary part of the decoder input.

Denoting the labels of the QAM symbols by ABCD, and assuming the score threshold is high, so that score-clipping does not occur, the approximated scores of the channel bits A, B, C, and D are:

| | |
|---|---|
| $L_1(A) = d^2,$ | $L_0(A) = c^2,$ |
| $L_1(B) = f^2,$ | $L_0(B) = e^2,$ |
| $L_1(C) = a^2,$ | $L_0(C) = b^2,$ |
| $L_1(D) = g^2,$ | $L_0(D) = h^2.$ |

As depicted in FIG. 2, the scoring for each bit is deinterleaved using the Bit Deinterleaver Matrix 220. The matrix is filled column-wise and read row-wise.

Next, convolution decoding (Viterbi Algorithm Unit) 230 is performed; the unit implements a method which is exactly identical to the well known 64 states Viterbi algorithm for soft decoding of convolutionally encoded BPSK (or QPSK) signal, except for a single difference: It uses the approximated scores calculated by the score calculation unit, rather than the conventional scores (which are the squared distances from the "0" and "1" levels of the binary signal). These methods implement 128 branches per bit for rate ½ code, and possibly less than that for punctured codes. There are several low cost IC's that implement such methods for data rates of more than 30 million information bits per second (e.g. DBS receivers). The cost of these IC's also includes A/D conversion, re-sampling, filtering, acquisition, de-interleaving, and Reed-Solomon decoding is below $10, and their power consumption is in the range of 1 W or below. (See e.g., "Digital Communications", J. G. Proakis, $3^{rd}$ Edition, McGraw Hill, 1995, pp. 483-486 for a description of the conventional algorithm).

The iterative method allows for significant improvement of the error rate of the decoder by:

1. Iterations between the most significant bits and the least significant bits of the channel symbols (soft outputs).

For this approach, soft decisions on bits of a certain channel symbol that have been decoded in this iteration or in previous iterations, are fed into the score calculation unit for decoding of other bits of this channel symbol. The soft decision can be obtained by multiple methods known in the literature, e.g. the SOVA algorithm (see, e.g. Hagenhauer).

2. Identification of noise impulse periods and giving low weights to the scores of the bits which occurred during this period.

Noise burst periods can be identified by:

a. Appearance of high magnitudes of the IF signal during a certain period of time.

b. Appearance of decoder inputs that are remote from all the constellation symbols during a certain period of time.

c. Low fidelity of the decoder decision (e.g. high residual decoder errors, or events where the state of the decoder having the best cost is not a parent of the state of the decoder having the best cost in the next iteration) relating to bit transmitted in a certain period of time.

d. Error correction of the outer Reed-Solomon decoder in data bytes that related to a certain period of time.

The decoder may employ a device that identifies relatively high rate of appearance of the above events (or other indication for impulse noise) and uses that to assess the likelihood that a certain time period is infected by high level of noise. This assessment is then provided to the decoder for giving low weights to the scores of the bits, which occurred during this period. Note that indications a and b can be measured before the first iteration of the method, and thus can also be used in a non-iterative method.

The present invention provides a BICM method for combating impulse noise and provides improved communications methods.

Thus, the present invention provides:

1. Modification to an encoding method to make it suitable for use in an impulse noise environment.
2. Decoding methods that are computationally efficient and are robust to impulse noise.
3. Systems for communications over the CATV upstream plant using TDMA QAM modulation and BICM code.

An Appendix is attached that provides details for implementing a presently preferred embodiment of the present invention. This embodiment is for use in a DOCSIS 1.2 system and describes the changes to the DOCSIS specification needed to implement this embodiment.

APPENDIX

Figure 4:
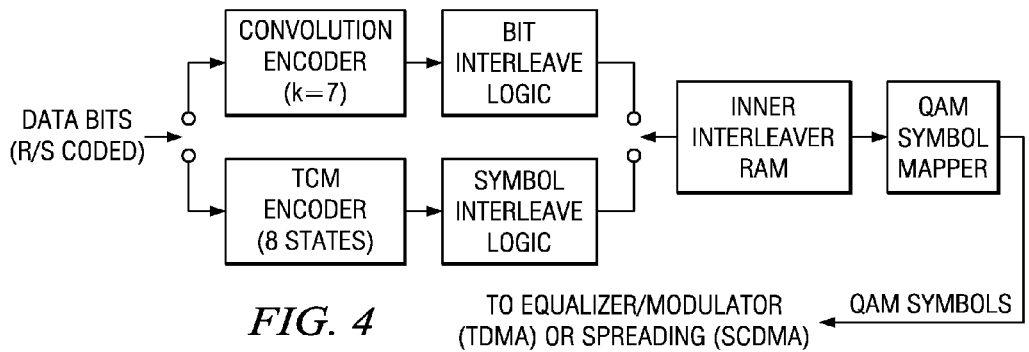
FIG. 4 depicts the blocks effected by adding BICM to an FEC.

FIG. 4 shows the block diagram of the FEC for a DOCSIS 1.2 system using BICM code, where the blocks with the gray background are the blocks to be added to the FEC.

The following document lists the additions to the draft DOCSIS 1.2 for adding a BICM mode.

Section 4.2.2. Signal Processing Requirements

Figure 5:
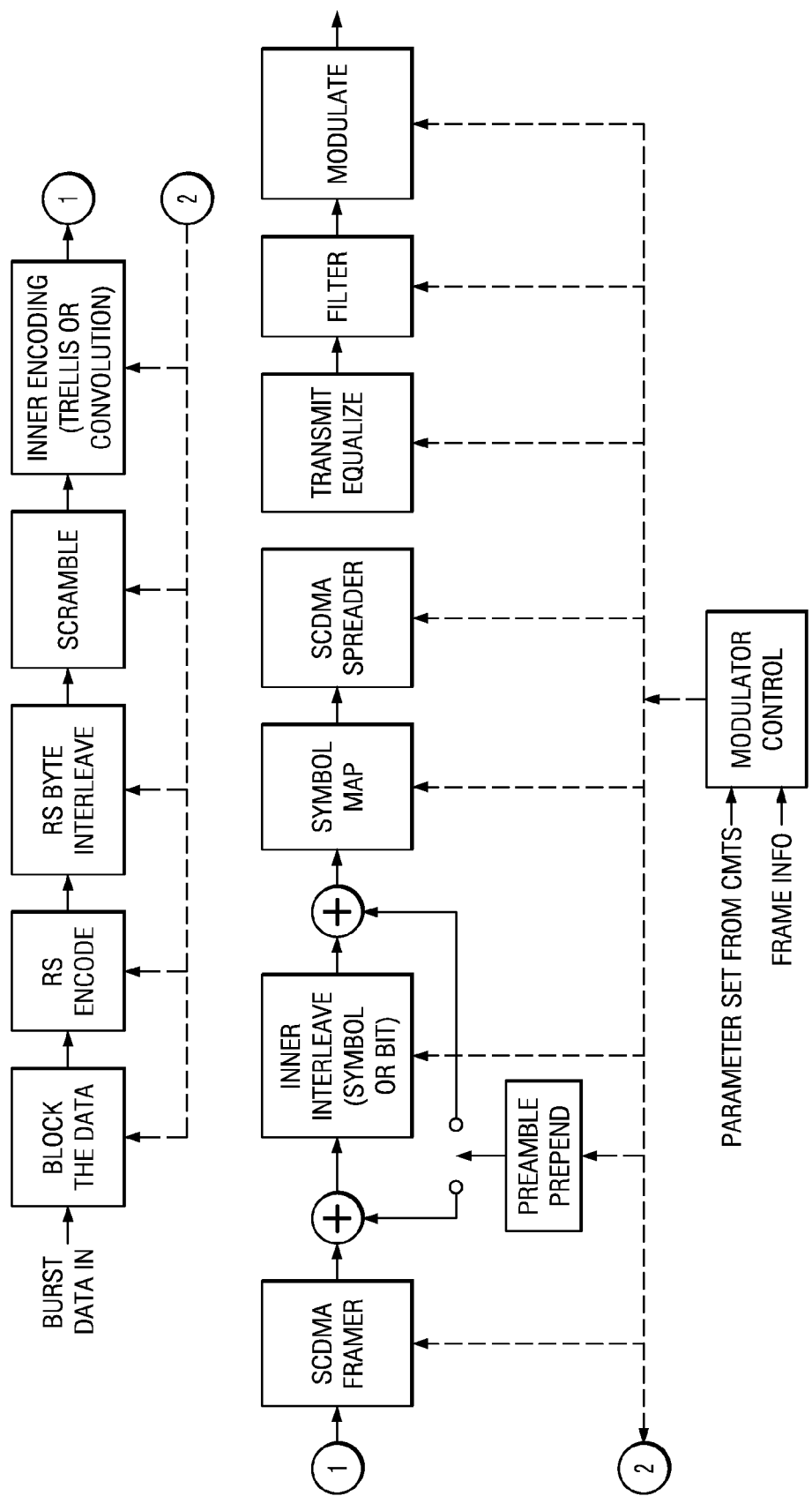
FIG. 5 is a DOCSIS 1-2 upstream transmission processing scheme modified in accordance with the teachings of the present invention.

FIGS. 4-4 should be replaced with FIG. 5. The blocks that are effected by adding the BICM are drawn with a gray background.

Section 4.2.10 Trellis Coded Modulation

Change the name of the section to "Coded Modulation", and replace the first sentence with: "The upstream modulator MUST support 8-state TCM encoding and Bit-Interleaved Coded Modulation (BICAF) for 2-dimensional modulation symbols."

Add the following subsections to section 4.2.10:

4.2.10.3 BICMs Bit Encoder

FIG. 6 shows the BICM bit encoder. It consists of a rate ½ convolution encoder followed by a puncturing unit. Such an encoder is widely use in the digital communications industry.

The constraint length of convolution encoder is 7 bits, and its generator polynomials are 133 octal and 177 octal. The outputs of the convolution encoders are:

$x_n = \text{XOR}(b_n, b_{n-1}, b_{n-2}, b_{n-3}, b_{n-6})$ $y_n = \text{XOR}(b_n, b_{n-2}, b_{n-3}, b_{n-5}, b_{n-6})$ where $b_n$ is the n-th input bit to the decoder. The initial state of the convolution-encoder must be the zero state. After encoding of all information bits in an upstream packet, six additional zero tail information bits are added.

The puncturing pattern of the puncturing unit is:

| Code Rate | Puncturing pattern | Output |
|---|---|---|
| ½ | x: 1<br>y: 1 | $x_n y_n$ (n = 0, 1, 2, ...) |
| ⅔ | x: 1 0<br>y: 1 1 | $x_n y_n y_{n+1}$ (n = 0, 2, 4, ...) |
| ¾ | x: 1 0 1<br>y: 1 1 0 | $x_n y_n y_{n+1} x_{n+2}$<br>(n = 0, 3, 6, ...) |
| ⅚ | x: 1 0 1 0 1<br>y: 1 1 0 1 0 | $x_n y_n y_{n+1} x_{n+2} y_{n+3} x_{n+4}$<br>(n = 0, 5, 10, ...) |

The puncturing mode and the constellation to be used for m=1, 2, ... 6 information bits per symbol are:

| m [bits/symbol] | 1 | 2 | 3 | 4 | 5 | 6 |
|---|---|---|---|---|---|---|
| Constellation | QPSK | 16 QAM | 16 QAM | 64 QAM | 64 QAM | 256 QAM |
| Puncture mode | ½ | ½ | ¾ | ⅔ | ⅚ | ¾ |

4.2.10.4. Symbol Mapping for BICM

When using BICM, the CM shall use the QPSK, 16-QAM and 64-QAM Gray coded constellations defined in 4.2.9.2. The symbol mapper input bits will be read serially from the bit interleaver (section 4.2.11.2). In the 256 QAM mode of BICM, the CM will use conventional Gray code constellations. The input bit definition (MSB-LSB) will be 13 $Q_3$ $I_2$ $Q_2$ $I_1$ $Q_1$ $I_0$ $Q_0$. The gray mapping of the real and the image and real parts of the symbol is:

| $B_3 B_2 B_1 B_0$ | 0010 | 0011 | 0001 | 0000 | 0100 | 0101 | 0111 | 0110 |
|---|---|---|---|---|---|---|---|---|
| Value | −15 | −13 | −11 | −9 | −7 | −5 | −3 | −1 |
| $B_3 B_2 B_1 B_0$ | 1110 | 1111 | 1101 | 1100 | 1000 | 1001 | 1011 | 1010 |
| Value | 1 | 3 | 5 | 7 | 9 | 11 | 13 | 15 |

The following sub-section should be added to section 4.2.11.

4.2.11.2 BICM Bit Interleaver

BICM Bit Interleaver bits shall be interleaved after inner coding in order to add time diversity to the signal, and thus to improve robustness to impulse and burst noise. Due to the bit interleaving operation, a noise burst that causes a sequence of multiple symbol errors appears after de-interleaving as several events of a single channel bit error, which are more easily recovered by the decoder.

Similarly to the symbol interleaving case, the two parameters that define the structure of the bit interleaver are the interleaver depth ($I_t$), and group length ($N_t$), measured in units of bits. The bits are written serially to the interleaver-matrix line by line and read serially column by column. When the number of coded bits in the packet is not an integer multiple of $N_t$ bits, the last group of the packet is made shorter than a full group ($N_t'$).

The total block size allocated for the interleaver shall be the same as the size allocated for the TCM symbol interleaver, which is currently 7168 bits. The group length $N_t$ shall be programmable in the range 1, ... 255, and the interleaver depth shall be programmable in the range 0 ... ceil(7168/$N_t$), where as in the case of symbol interleaving $I_t$=0 denotes dynamically configured $I_t$ value, and where $N_t$=1 is the case of no bit interleaving.

FIG. 7 shows an example of the bit interleaving process, in the case of a packet of 16 coded bits, $N_t$=5, and 16 QAM modulation.

In this example, the first symbol will consist of the bits $z_1$, $z_6$, $z_{11}$, $z_{16}$, the second symbol will consist of $z_2$, $z_7$, $z_{12}$, $z_3$; the third symbol will consist of $z_8$, $Z_{13}$, $z_4$, $z_9$; and the last symbol consists of the bits $z_{14}$, $z_5$, $z_{10}$, $z_{15}$.

Similarly to the case of symbol interleaving, when $I_t$=0 and the number interleaved bits N is not larger than 7168 bits, $I_t$ is dynamically configured at the CM according to the formula $I_t$=ceil($N_p/N_t$)

When $N_p$ is larger than 7168 bits, the packet should be interleaved in multiple segments using the algorithm used for symbol interleaving for the case of more than 1024 symbols per packet.

Preamble Prepend (Section 4.2.12)

Add the following subsection:

4.2.12.1 Preamble Insertion in BICM Mode:

When BICM is used, the preamble symbols can be added in two modes: either before the data symbols, or they may be interleaved within the data symbols. In the later case the preamble symbols are inserted every MIN{8, ceil($N_{MESSAGE}/N_{PREAMBLE}$)} symbols starting from the first symbol, where $N_{MESSAGE}$ is the number of encoded data symbols in the burst, and $N_{PREAMBLE}$ is the number of preamble symbols. For example, when $N_{MESSAGE}$=13 and $N_{PREAMBLE}$=4, the burst will be $P_0 D_0 D_1 D_2 D_3 P_1 D_4 D_5 D_6 D_7 P_2 D_8 D_9 D_{10} D_{11} P_3 D_{12}$, where $P_n$ and $D_n$ denote the preamble and the data symbols respectively.

Burst Profile Attribute (Section 4.2.15-table 4-6.)
    change "TCM Coding On/Off=On/Off" with "Inner Coding Scheme=Off/TCM/BICM $N_t$ can be configured to 1, . . . 255 (at least in the case of BICM).

Notation changes:
1. change "Modulation=QPSK, 8QAM, . . . 0.128QAM" with "Information bits per symbol (m)=1 to 6"
2. Change "TCM Interleave" with "Inner Interleave".
3. regarding preamble insertion position, change "Before/After TCM Interleaver" with "Interleaved/Non-interleaved".

What is claimed is:

1. A decoding method, comprising:

receiving, at a receiver, a sequence of soft QAM symbols;

scoring each bit for a decoding of a received soft QAM symbol by the minimum squared distance from corresponding symbols of the QAM constellation defined by said each bit to the real or imaginary part of said received soft QAM symbol;

de-interleaving said bits subject to said scoring; and convolutionally decoding, using a viterbi algorithm unit, said de-interleaved bits using results of said scoring.

* * * * *